Patented June 27, 1933

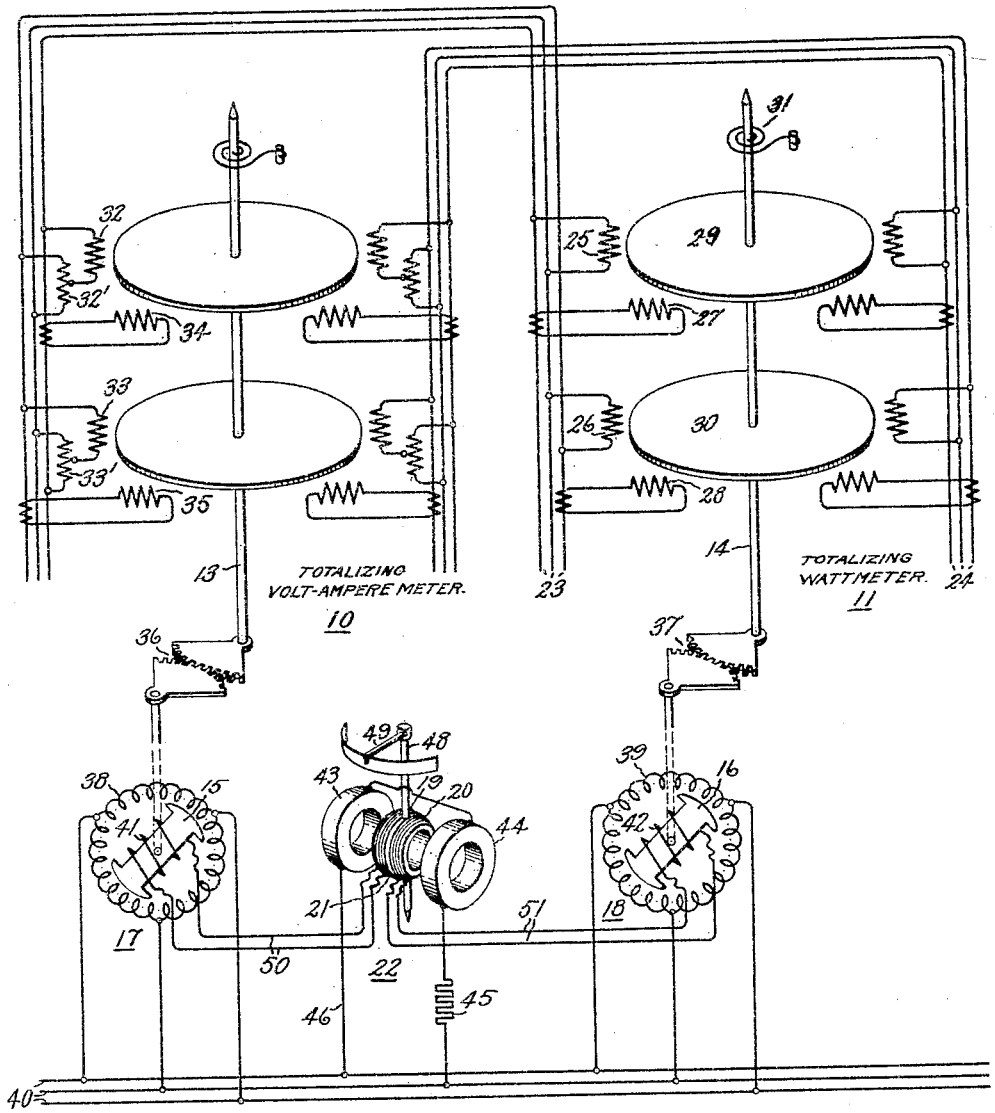

1,916,075

UNITED STATES PATENT OFFICE

RALPH M. ROWELL, OF LYNN, MASSACHUSETTS, ASSIGNOR TO GENERAL ELECTRIC COMPANY, A CORPORATION OF NEW YORK

ELECTRICAL INSTRUMENT

Application filed August 20, 1931. Serial No. 558,303.

My invention relates to electrical instruments and in particular to power factor indicating devices. The principal object of my invention is to provide an arrangement for obtaining indications of total station power factor from the indications of totalizing wattmeters and volt-ampere meters in an electric generating or distributing station. Another object of my invention is to provide means for indicating power factor at a distance. Other and further objects will become apparent from the description.

In accordance with my invention I provide a totalizing wattmeter, a totalizing volt-ampere meter and phase shifters for use with each of said instruments. I provide a mechanical connection between the moving element of each instrument and the rotatable winding of the corresponding phase shifter. The phase shifters are energized from the same alternating current supply. Accordingly, a voltage is induced in the rotor of each phase shifter, the phase of which depends upon the indication of the totalizing instrument to which it is mechanically connected. The rotor winding of the phase shifter associated with the wattmeter is electrically connected to one of the moving coils of a power-factor meter, and the rotor winding of the other phase shifter is electrically connected to the other moving coil of the power-factor meter. The field of the power-factor meter is supplied from the same source of alternating current as the phase shifters. The power-factor meter accordingly gives an indication of the total station power factor.

The features of my invention which I believe to be novel and patentable will be pointed out in the claims appended hereto. For a better understanding of my invention, reference may be had to the accompanying drawing which represents schematically the essential parts of one embodiment of my invention.

My invention is here shown as embodying the totalizing volt-ampere meter 10 and the totalizing wattmeter 11, having shafts 13 and 14, mechanically connected to the rotors 15 and 16 of the phase shifters 17 and 18, which rotors are in turn electrically connected to the potential coils 19 and 20 of the moving element 21 of a power-factor meter 22. In this embodiment I have shown three-phase totalizing instruments of the induction disk type, but it will be understood that other forms of instruments may be used if desired. For simplicity, I have shown the apparatus as arranged for totalizing only two polyphase circuits 23 and 24, but it will be understood that the apparatus may be arranged for a greater number of circuits.

The wattmeter 11 is of a standard polyphase type having potential coils 25 and 26 and current coils 27 and 28, reacting upon disks 29 and 30 to produce a torque proportional to the power load on circuit 23. The disks 29 and 30 are carried by the shaft 14, which is provided with the restraining spring 31. A similar set of coils connected to circuit 24 produces a torque proportional to the power load of circuit 24.

The volt-ampere meter 10, having potential coils 32 and 33, and current coils 34 and 35, connected in circuit 23, and corresponding potential and current coils connected in circuit 24, is similar to wattmeter 11, except that the phase relationship between its current and potential coils is changed so that a torque is produced proportional to volt-amperes at the average power-factor instead of watts. This may be done by connecting the potential coils 32 and 33 to the circuit 23 through phasing transformers 32' and 33', which form no part of my invention. Similar phasing transformers are provided for the potential coils associated with circuit 24. Another way in which I may accomplish this result is to cause the maximum torque to be produced at a definite value of power factor other than unity in the manner disclosed in U. S. Patents 1,530,322 of 1925 and 1,698,276 of 1929 to William H. Pratt. These arrangements will give measurements of volt-amperes within certain ranges of power factor. It will be understood that other methods, known in the art, for changing the phase relationship between the current and potential coils may also be employed. Where accuracy over all ranges of power factor is desired, resort may be had to rotating element phase transformers of the type disclosed in U. S. Patents 1,342,082 of 1920 to Donald J. Angus and 1,571,234 of 1926 to Frank Conrad. It will be understood that if the device is to be made responsive to a greater number of circuits than here shown, the volt-ampere meter 10 will also be provided with additional current and potential coils as explained in connection with the description of wattmeter 11. The construction of the totalizing wattmeter and volt ampere meter is not my invention.

The mechanical connection of shafts 13 and 14 of instruments 10 and 11 with the rotors 15 and 16 of phase shifters 17 and 18 may take the form of gear sectors 36 and 37. Phase shifters 17 and 18 are provided with primary windings 38 and 39 excited by the same polyphase source of supply 40, and with secondary windings 41 and 42. I have shown the primary windings 38 and 39 as stationary windings, and the secondary windings 41 and 42 as movable windings, but it will be understood that the primary and secondary windings might be interchanged in mechanical position without changing the principle of operation.

Since the primary windings 38 and 39 of the phase shifters 17 and 18 are wound for polyphase alternating current, rotating magnetic fields will be set up in each of these devices, and voltages will be induced in the secondary windings 41 and 42, the phase relationships of which will depend upon the angular positions of the rotors 15 and 16. Since the rotors 15 and 16 are mechanically connected to the moving elements of the instruments 10 and 11, the phase relationships of the voltages induced in the secondaries 41 and 42 of the phase shifters 17 and 18 will depend upon the deflections of instruments 10 and 11. Accordingly, an instrument 22 is provided responsive to the phase relationship of these voltages.

The instrument 22 is of the same construction as a standard power-factor meter, except that its field coils are wound with a larger number of turns in order that they may be excited from one phase of the supply 40. The field coils 43 and 44 in series with a resistor 45 are connected by means of conductors 46 to one phase of the same source 40, which supplies the primaries 38 and 39 of the phase shifters 17 and 18. A moving element 21, having a vertical shaft 48 carries the moving coils 19 and 20, and also carries the pointer 49. The moving coils 19 and 20 are so connected to secondary windings 41 and 42 of the phase shifters 17 and 18, by means of leads 50 and 51, that they normally tend to oppose each other. The magnitude and direction of the forces acting upon the moving coils obviously depend upon the phase relationships between the currents in the moving coils, and the current in the stationary coil. Since the power-factor meter circuits are all supplied directly or indirectly from the same source 40 the indication will be independent of ordinary voltage variations of such source. Accordingly, coil 19 is acted upon by a force dependent upon the number of volt-amperes indicated by meter 10, and coil 20 is acted upon by a force dependent upon the number of watts indicated by meter 11. The instrument 22 operates upon the well-known ratio principle, whereby the pointer 49 comes to rest when the opposing forces acting upon the moving element 21 are balanced, which occurs at a position dependent upon the ratio of the forces acting. Consequently, the meter 22 provides an indication of the ratio of the total watts to the total volt-amperes, which is the power factor of the station. It will be understood that the shape of the calibration curve of the power-factor meter 22, when used with the totalizing meters, and the phase shifters 17 and 18, may differ from that of a similar instrument used as an ordinary power-factor meter connected directly into a circuit to be measured. Although I have shown the instrument 22 to be of a particular construction, it will be understood that other types of instruments suitable for measuring phase differences may be employed without departing from the spirit of my invention.

I have shown my invention in an arrangement which embodies the combination of a volt-ampere meter and a wattmeter, with other apparatus to obtain an indication of power factor because these instruments are the ones most generally found in generating and distributing stations. It will be understood however that I might also employ an instrument measuring the reactive component of volt-amperes in combination with a wattmeter. This arrangement would have the advantage of greater simplicity where the device was designed for accuracy at all values of power factor. Obviously, the shape of the calibration curve of instrument 22 would be somewhat different in this embodiment of my invention than in the one previously described.

Although I have illustrated an instrument of the indicating type, it will be understood that my invention is not limited to indicating instruments.

My invention has the advantage that indications of power factor may, if desired, be obtained at a distance remote from the totalizing meters. Although applicable to use with either single circuit meters or with multiple circuit totalizing meters, my device is of particular value for indicating the combined power factor of several circuits, since separate indications of the power factors in the several circuits could not be directly combined to give an accurate value of station power factor.

My device is not limited to measurements of power factor, but is obviously also applicable to obtaining automatically the ratio of any two quantities from the deflections of the instruments measuring these quantities.

In accordance with the provisions of the patent statutes, I have described the principle of operation of my invention together with the apparatus which I now believe to represent the best embodiment thereof, but desire to have it understood that the apparatus shown and described is only illustrative and that my invention may be carried out by other arrangements.

What I claim as new and desire to secure by Letters Patent of the United States, is:

1. In combination, a source of polyphase alternating current, a wattmeter, a volt-ampere meter, each having moving indicating elements, phase-shifting devices comprising stator windings energized by said source of current, and rotor windings mechanically connected respectively with the moving elements of said wattmeter and volt-ampere meter, and a power-factor meter having a pair of opposed windings connected respectively with the rotor windings of said phase-shifting devices.

2. In combination with an alternating-current electrical circuit, a power-factor indicating device comprising means responsive to the power of said circuit, means responsive to the volt-amperes thereof, means cooperating therewith for transmitting single-phase alternating currents having phase relationships depending upon power and volt-amperes respectively of said circuit, and means jointly responsive to the phase relationships of said transmitted alternating currents to give an indication of the power factor of said circuit.

3. In combination with an alternating current electrical circuit, a source of polyphase alternating current, a power-factor indicating device comprising means responsive to the power of said circuit, a phase-shifting device cooperating therewith and energized by said polyphase source, means responsive to the volt-amperes of said circuit, a second phase-shifting device cooperating therewith and energized by said polyphase source, said phase-shifting devices producing currents varying in phase with the power and the volt-amperes respectively, and means controlled jointly by the currents produced by said phase-shifting devices, giving a response dependent upon the power factor of said circuit.

4. In combination with a plurality of alternating-current electrical circuits, a power-factor indicating device, comprising means responsive to the sum of the power loads on each of said circuits, a translating device cooperating therewith, means responsive to the sum of the volt-amperes flowing in each of said circuits, a second translating device cooperating therewith, and means controlled jointly by said translating devices giving a response, dependent upon the average power factor of all the circuits.

5. In a device responsive to the quotient of two quantities, a source of polyphase alternating current, a pair of measuring instruments, each responsive to the magnitude of one of said quantities and each having a moving element, phase-shifting devices comprising stator windings energized by said source of current, and rotor windings mechanically connected respectively with the moving elements of said measuring instruments, and a phase responsive meter having a pair of opposed windings each connected with the rotor winding of one of said phase-shifting devices.

6. In combination with an alternating-current electrical circuit, a power-factor indicating device comprising movable means responsive to the power of said circuit, movable means responsive to the volt-amperes of said circuit, a pair of phase-shifting devices having exciting and secondary windings, one of which is movable with respect to the other, and a power-factor meter having a field winding and a pair of moving coils in inductive relation therewith, said power responsive means being mechanically connected with the movable winding of one of said phase-shifting devices, said volt-ampere responsive means being mechanically connected to the movable winding of the other of said phase-shifting devices, thereby causing currents in said secondary windings to vary in phase with variations in position of the associated movable responsive means, the secondary windings of each of said phase-shifting devices being electrically connected with one of the moving coils of said power-factor meter, so as to cause an indication of the power factor of the circuit.

7. In combination a plurality of alternating current power systems, a totalizing wattmeter for measuring the power flowing in said systems, a totalizing volt-ampere meter for measuring the volt-amperes of said systems, an alternating current circuit, a pair of phase shifters energized by said circuit and mechanically operated respectively in response to the measurements of said totalizing meters and a power factor instrument energized through said phase shifters for giving an indication of the average power factor of all of said power systems.

8. In combination a plurality of alternating current power systems, a pair of totalizing meters for measuring and totalizing different characteristics of said systems, an alternating current circuit, a pair of phase shifters energized by said circuit and mechanically operated respectively in response to the measurements of said totalizing meters and an instrument having windings energized through said phase shifters for indicating the average power-factor of all of said power systems.

9. In a device responsive to the quotients of two quantities, a pair of measuring instruments having movable elements, each of said instruments being responsive to the magnitude of one of said quantities, a pair of phase-shifting devices having exciting and secondary windings, one of which is movable with respect to the other, and an electric phase indicating instrument having a field winding and a pair of moving coils in inductive relation therewith, each of said measuring instruments being mechanically connected to the movable winding of one of said phase-shifting devices, thereby causing currents in said secondary windings to vary in phase with variations in position of the associated movable elements of said measuring instruments, the secondary windings of each of said phase-shifting devices being electrically connected with one of the moving coils of said electric phase responsive instrument so as to provide an indication of the quotient of said quantities.

10. A device responsive to the quotients of two quantities, comprising separate means each responsive to one of said quantities, means cooperating therewith for transmitting single-phase alternating currents having phase relationships depending upon the magnitudes of said quantities, and means jointly responsive to the phase relationship of said transmitted alternating currents to give an indication of the quotient of the measured quantities.

In witness whereof, I have hereunto set my hand.

RALPH M. ROWELL.